C. F. Mietzsch,
Water Filter,
Nº 58,868. Patented Oct. 16, 1866.
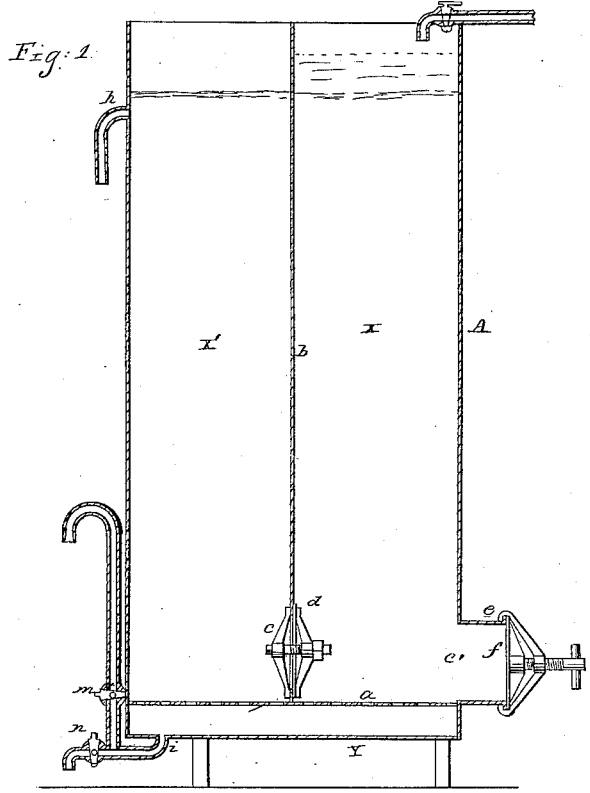
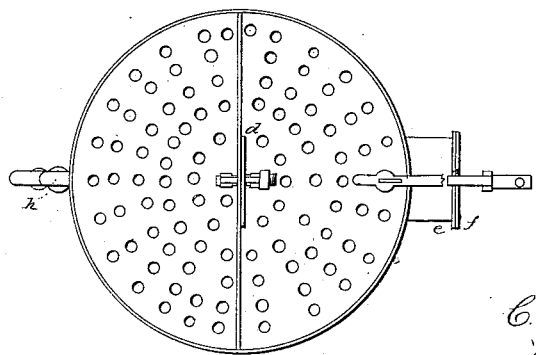
Witnesses:
John Parker
S. K. Hodsie Godwin
Inventor:
C. F. Mietzsch
By his Attorney
H. Howson

UNITED STATES PATENT OFFICE.

CHARLES F. MIETZSCH, OF PHILADELPHIA, PENNSYLVANIA.

IMPROVEMENT IN FILTERS.

Specification forming part of Letters Patent No. 58,868, dated October 16, 1866.

*To all whom it may concern:*

Be it known that I, C. F. MIETZSCH, of Philadelphia, Pennsylvania, have invented certain Improvements in Filters; and I do hereby declare the following to be a full, clear, and exact description of the same, reference being had to the accompanying drawings, and to the letters of reference marked thereon.

My invention consists of a filter having two or more compartments containing filtering material, arranged in respect to each other and to a lower chamber, as fully described hereinafter, so that the liquor to be filtered may be more effectually and speedily purified, and so that the filtering material may be employed for a longer time than when the ordinary filter is used.

In order to enable others skilled in the art to make and use my invention, I will now proceed to describe its construction and operation.

On reference to the accompanying drawings, which form a part of this specification, Figure 1 is a sectional elevation of my improved filter; and Fig. 2 a plan view.

A is a cylindrical casing, which is divided by a horizontal perforated partition, $a$, and an upright partition, $b$, into three compartments or chambers, X, X', and Y. In the lower part of the partition $b$ is an opening, $c$, to which is fitted a detachable cover, $d$, and opposite the said opening, in the side of the casing A, is an opening, $c'$, surrounded by a flange, $e$, and to the outer end of the latter is fitted a detachable cap or cover, $f$. At the upper end of the casing is a pipe, $h$, which communicates with the compartment X', and with the chamber Y communicates a pipe, $i$, which is divided into two branches, the latter being provided with stop-valves $m$ $n$.

The compartments X and X' are filled with charcoal or other suitable filtering material, and the cane-juice to be filtered is introduced into the upper end of the compartment X. The juice first passes downward through the material in the chamber X and through the partition $a$ to the chamber Y, and then upward through the partition $a$ and material in the chamber X' to the pipe $h$, through which it flows in a clarified state to any suitable receptacle.

In the ordinary filters the juice passes downward through a body of bone-black, and is drawn off near the bottom of the casing, and carries with it to the point at which it is drawn from the filter all the dust and refuse which it collects in its passage downward. It is therefore necessary, after the first introduction of the liquor, for the latter to remain undisturbed in the filter for several hours, so that the sediment may settle onto the bottom of the casing.

In the ordinary filter, also, the liquor is sometimes (through carelessness or ignorance on the part of the attendant) nearly all withdrawn, and the air is permitted to enter between the particles of filtering material and into contact with the liquor, which adheres to the same, the action of the air on the juice reducing the latter to a gummy condition, so that it obstructs the interstices between the particles of bone-black, greatly impairing the efficiency of the filter. This is especially the case at the top of the filtering material, as the juice frequently sinks below the surface of the charcoal, and is followed by the air before an additional supply of juice can be introduced, a thick crust being thus formed, which requires to be frequently broken in order that the juice below may not be held in suspension in the filter.

I have found by lengthened practical experiments with the filter above described that the dust and sediment in the charcoal in the chamber X are carried to the chamber Y and left there, while the ascending current is not rapid enough to carry upward any dust which may be in the charcoal in the chamber X', so that the liquor passes from the pipe $h$ in a purified condition, without the necessity of any delay in withdrawing it.

As the pipe $h$ is nearly level with the surface of the filtering material, it will be apparent that the liquor can by no accident be withdrawn any distance below the said surface, so that the entrance of air among the particles of charcoal and into contact with the juice adhering to the same is prevented.

I have found that a filter of this construction can be efficiently used (without removing the charcoal) for five days, while one made in the ordinary manner would be unserviceable at the end of three days, and that in all cases the juice is better filtered and flows out more freely than in the ordinary filter.

In my improved filter, also, the juice travels a much greater distance through the filtering material than in filters of the same size constructed in the ordinary manner.

When no more liquor has to be filtered the portion remaining in the filter is withdrawn by opening the valve-cock $n$, after which the filter may be washed out. The charcoal is removed through the openings $c$ and $c'$ after detaching the caps or covers $d$ and $f$.

It will be apparent that two or more vertical partitions may be used, so that the liquor shall pass up and down several times before leaving the filter.

It will be seen that the perforated partition $a$ and vertical partition $d$ may be readily placed in the ordinary filters at a comparatively small expense, and that, although I have alluded to the filter as being used for purifying cane-juice, it may be used with advantage for filtering other viscid materials.

I claim as my invention and desire to secure by Letters Patent—

A filter having two or more chambers or compartments containing filtering material, so arranged in respect to each other, to an outlet-pipe, and to a lower chamber that the fluid to be filtered must pass downward through the material in one compartment to the lower chamber, and then upward through the material in the other chamber to the outlet-pipe, without rising above the surface of the filtering material in the second chamber, as and for the purpose described.

In testimony whereof I have signed my name to this specification in the presence of two subscribing witnesses.

C. F. MIETZSCH.

Witnesses:
CHARLES E. FOSTER,
W. J. R. DELANY.